United States Patent
Kramer et al.

(10) Patent No.: US 6,433,100 B1
(45) Date of Patent: Aug. 13, 2002

(54) PROCESS FOR THE PREPARATION OF POLYMERS CONTAINING N-O TERMINAL GROUPS

(75) Inventors: Andreas Kramer, Düdingen; Andreas Mühlebach, Frick; François Rime, Delémont, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/763,432

(22) PCT Filed: Sep. 18, 1999

(86) PCT No.: PCT/EP99/06924

§ 371 (c)(1),
(2), (4) Date: Feb. 22, 2001

(87) PCT Pub. No.: WO00/18807

PCT Pub. Date: Apr. 6, 2000

(30) Foreign Application Priority Data

Sep. 29, 1998 (EP) .............................................. 98810979

(51) Int. Cl.$^7$ .................................................. C08F 8/30
(52) U.S. Cl. ................................ 525/327.6; 525/328.2; 525/328.7; 525/328.8; 525/329.9; 525/390.5; 525/333.6; 525/375; 525/377; 526/82

(58) Field of Search ................................. 525/375, 377, 525/327.6, 328.2, 328.7, 328.8, 328.9, 330.5, 333.6; 526/82

(56) References Cited

U.S. PATENT DOCUMENTS 6,274,683 B1 * 8/2001 Benage et al. ................. 436/85

FOREIGN PATENT DOCUMENTS

| EP | 0 135 280 | 3/1985 |
| WO | 98 07758 | 2/1998 |
| WO | 98 13392 | 4/1998 |

* cited by examiner

*Primary Examiner*—Bernard Lipman
(74) *Attorney, Agent, or Firm*—Kevin T. Mansfield

(57) ABSTRACT

The invention relates to a process for the preparation of polymers containing N→O terminal groups and to compositions comprising polymers obtained by this process. The process comprises polymerizing by atom transfer radical polymerization (ATRP) an aliphatic monomer of oligomer containing ethylene groups in the presence of a polymerization initiator.

16 Claims, No Drawings

PROCESS FOR THE PREPARATION OF POLYMERS CONTAINING N-O TERMINAL GROUPS

The present invention relates to a process for the preparation of polymers containing N→O terminal groups and to compositions comprising polymers obtained by this process.

The present invention relates to the preparation of polymers characterized by a low polydispersity range, preferably a polydispersity range which is lower than 3, and an enhanced monomer to polymer conversion efficiency. In particular, this invention relates to a stable, free radical initiated polymerization process by the ATRP (Atom Transfer Radical Polymerization) method which produces homopolymers, random copolymers, block copolymers, multiblock copolymers, graft copolymers and the like having a low polydispersity range and predetermined molecular weights.

Polymers or copolymers prepared by a conventional free radical polymerization reaction inherently have broad molecular weight distributions and a polydispersity range which is generally greater than three. This is explained by the fact that the half-life of most free radical initiators is relatively long, ranging from several minutes to hours. Polymeric chain reactions are initiated at different points of time which enables the initiators to generate growing chains of various lengths at any time period during the polymerization process. Moreover, the propagating chains may react with each other in free radical side reactions known as combination and disproportionation. Both are irreversible chain terminating reaction steps. The formation of chains of varying lengths is terminated at different points of time during the reaction, resulting in polymers of very different chain lengths, i.e. from very small to extremely long, and broad polydispersity ranges. Whenever a homogeneous molecular weight distribution is desirable in a free radical polymerization process, the growth of the polymer chains is to be initiated simultaneously to avoid termination at different points of time.

Therefore, any conventional free radical polymerization process is characterized by significant drawbacks, such as difficulties in predicting or controlling the molecular weight distribution of the polymer obtained and the polydispersity range. Furthermore, free radical polymerization processes are difficult to control. Most polymerization reactions are strongly exothermic, rendering it almost impossible to efficiently remove heat from the highly viscous polymer reaction mixture. The problems of conventional free radical polymerization reactions of the types mentioned above may also result in an undesirable formation of gel-type polymers of broad molecular weight distribution. They are difficult to handle in subsequent working-up steps, such as separation, purification, filtering and drying.

There is an urgent need for suitable agents which are useful for overcoming these drawbacks and which provide an efficient control of free radical initiated polymerizations. This will result in the preparation of polymers of defined chemical, and physical properties, such as viscosity, hardness, gel content, clarity, high gloss, durability and the like.

Therefore, the efficient control of reaction parameters in free radical polymerization processes is highly desirable. Among the different proposed methods some may be defined by the term "living" polymerization. This method aims at a defined chain growth by the efficient reduction of chain terminating side reactions. Such a polymerization would provide for molecular weight control and narrow molecular weight distribution (MWD).

U.S. Pat. No. 4,581,429 discloses a free radical polymerization process which controls the controlled or "living" growth of polymer chains to produce oligomeric homopolymers and copolymers, including block and graft copolymers. A process embodiment is the use of initiators of the partial formula R'R"N—O—X. In the polymerization process the free radical species R'R"N—O. and .X are generated. .X is a free radical group, e.g. a tert.-butyl or cyanoisopropyl radical, capable of polymerizing monomer units containing ethylene groups. The monomer units A are substituted by the initiator fragments R'R"N—O. and .X and polymerize to structures of the type: R'R"N—O—$A_n$—X. Specific R'R"N—O—X initiators mentioned are derived from cyclic structures, such as 2,2,6,6-tetramethylpiperidine, or open chain molecules, such as di-tert.-butylamine.

WO 96/30421 discloses a controlled or "living" polymerization process of ethylenically unsaturated polymers such as styrene or (meth)acrylates by employing the ATRP method. According to this method initiators are employed which generate a radical atom such as .Cl, in the presence of a redox system of transition metals of different oxidation states, e.g. Cu(I) and Cu(II), providing "living" or controlled radical polymerization.

A general drawback of this prior art method is seen in the fact that the polymer chains prepared by ATRP contain halogen as terminal fragment which has been transferred from the polymerization initiator. The content of halogen is generally undesirable in polymers. Halogen, especially chlorine and bromine, is subject to the removal as hydrogen halide depending on temperature, especially above 150° C. The double bond thus formed is subject to a reaction with atmospheric oxygen which decreases the antioxidative resistance of the polymer. Moreover, hydrogen halide liberated from the polymer reacts with other functional groups present in the polymer, such as ester groups present in acrylates. Depending on the type of the polymer, chlorine is also removed in the form of a radical which might initiate undesirable chain reactions in the polymer structure.

The removal of halogen from the polymer structure, especially the terminal position of the polymer chain, is the problem to which the present invention particularly relates. It is desirable to have the halogen replaced with suitable substituents.

M. Sawamoto and M. Kamigaito, *J. Macromol. Sci. (J.M.S.)—Pure Appl. Chem.* A 34(10, pp. 1803–1814 (1997) disclose ATRP of methyl acrylate with the initiator dichloroacetophenone and a catalyst system consisting of $RuCl_2$ $(PPh_3)_3$ and the co-catalyst $Al(O-iPr)_3$. They report that the polymerization reaction is terminated with the addition of large amounts of TEMPO (=2,2,6,6-TEtraMethylPiperidyl-1-Oxide) or galvinoxyl. No products are reported to have been isolated and no properties have been disclosed.

It has surprisingly been found that terminal halogen in polymerisates, especially prepared by ATRP, is effectively replaced by the free radical species R'R"N—O., which may have an open chain or cyclic structure.

The present invention relates to a process for the preparation of a polymer of the formula

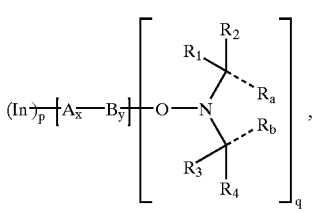
(I)

wherein:

In represents a polymerization initiator fragment of a polymerization initiator capable of initiating polymerization of monomers or oligopolymers containing ethylene groups;

p represents a numeral greater than zero and defines the number of initiator fragments;

A represents an oligopolymer or polymer fragment consisting of repeating units of polymerizable monomers or oligopolymers containing ethylene groups;

x represents a numeral greater than one and defines the number of repeating units in A;

B represents a monomer, oligopolymer or polymer fragment copolymerized with A;

y represents zero or a numeral greater than zero and defines the number of monomer, oligopolymer or polymer repeating units in B;

q represents a numeral greater than zero;

one of $R_1$ and $R_2$ represents $C_1$–$C_7$-alkyl and the other represents $C0$–$C_4$-alkyl or $C_1$–$C_4$-alkyl substituted by $C_1$–$C_4$-alkoxycarbonyl or $C_1$–$C_4$-alkoxy; or $R_1$ and $R_2$ together with the adjacent carbon atom both represent $C_3$–$C_7$-cycloalkyl;

$R_3$ and $R_4$ are as defined as $R_1$ and $R_2$;

$R_a$ represents $C_1$–$C_4$-alkyl, cyano, $C_1$–$C_4$-alkoxycarbonyl, $C_1$–$C_4$-alkanoyloxy, $C_1$–$C_4$-alkanoyloxy-$C_1$–$C_4$-alkyl, carbamoyl, mono- or di-$C_1$–$C_4$-alkylcarbamoyl, mono- or di-2-hydroxyethylcarbamoyl, amidino, 2-imidazolyl, 1-hydroxy-2-hydroxymethyl-2-propylcarbamoyl, or 1,1-dihydroxymethyl-2-hydroxycarbamoyl; and $R_b$ is as defined as $R_a$; or $R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulfur;

with the proviso that compounds of the formula I, wherein $R_1$, $R_2$, $R_3$ and $R_4$ represents methyl and $R_a$ and $R_b$ represents 1,3-propylene is excluded; which comprises polymerizing by atom transfer radical polymerization (ATRP) an aliphatic monomer or oligomer containing ethylene groups in the presence of a polymerization initiator of the formula:

[In$)_p$X$_q$]     (II), wherein p and q are as defined above, In represents a radically transferable atom or group capable of initiating polymerization of monomers or oligopolymers containing ethylene groups and —X represents a leaving group; and replacing —X in a polymerisate of the formula (In$)_p$[A$_x$—B$_y$]X$_q$     (III), wherein In, X, A, B, x, y, and p and q are as defined above, with a N→O compound of the formula

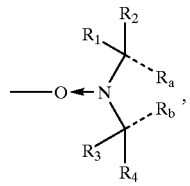
(IV)

wherein $R_1$–$R_4$ and $R_a$ and $R_b$ are as defined above, in the presence of a catalytically effective amount of an oxidizable transition metal complex catalyst.

The polymers according to the present invention are useful for many applications including a variety of specific technical applications, such as block copolymers used as compatibilizers for polymer blends, or dispersants for coating systems. The polymers or copolymers are characterized by a homogeneous molecular weight distribution and low halogen content. They are especially useful for as oligomers or polymers in the coating technology, for the preparation of thermoplastic films, toner res ins and liquid immersion development ink resins or ink additives for electrographic imaging processes.

In a polymer (I) the group In represents the polymerization initiator fragment of a polymerization initiator (II), which is capable of initiating the polymerization of the fragments A and B and subsequently proceeds by a reaction mechanism known under the term ATRP. A suitable polymerization initiator contains a radically transferable atom or group .X and is described in WO 96/30421 and WO 98/01480. A preferred radically transferable atom or group .X is .Cl or .Br, which is cleaved as a radical from the initiator molecule and subsequently replaced after polymerization as a leaving group with a N→O compound (IV). The index p is 1 if one group .X is present (q=1) in the polymerization initiator (II). The polymerization initiator may also contain more than one groups .X. In this case q may be 2 or 3.

A preferred embodiment of the invention relates to polymers, wherein p represents the numeral one; q represents a numeral from one to three; and In, A, B, x, y and $R_1$–$R_{10}$ are as defined above.

A preferred polymerization initiator (II) is selected from the group consisting of $C_1$–$C_8$-alkylhalides, $C_6$–$C_{15}$-aralkylhalides, $C_2$–$C_8$-haloalkyl esters, arene sulfonyl chlorides, haloalkanenitriles, α-haloacrylates and halolactones.

Specific initiators are selected from the group consisting of α,α'-dichloro- or α,α'-di-bromoxylene, p-toluenesulfonylchloride (PTS), hexakis(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benzacetonitrile and α-bromo-γ-butyrolactone (=2-bromo-dihydro-2(3H)-furanone).

The term polymer comprises oligopolymers, cooligopolymers, polymers or copolymers, such as such as block, multi-block, star, gradient, random, comb, hyperbranched and dendritic copolymers as well as graft or copolymers. An oligopolymer A contains at least two repeating units of polymerizable aliphatic monomers containing ethylene groups.

The aliphatic monomer or oligomers may be water-soluble or water-insoluble and may contain one or more olefinic double bonds. The monomers may be of low (monomeric) or high (oligomeric) molecular mass. Examples of monomers containing one olefinic double bond are styrenes which may be substituted at the phenyl group by additional substituents selected from the group consisting of hydroxy, $C_1$–$C_4$-alkoxy, halogen, e.g. chloro, and $C_1$–$C_4$-alkyl, e.g. methyl, acrolein, acrylonitrile, acrylic or $C_1$–$C_4$-alkylacrylic acid-($C_1$–$C_4$-alkyl)$_4$ammonium salts, acrylic or $C_1$–$C_4$-alkylacrylic acid-($C_1$–$C_4$-alkyl)$_3$NH salts, acrylic or $C_1$–$C_4$-alkylacrylic acid-$C_1$–$C_4$-alkyl esters, acrylic or $C_1$–$C_4$-alkylacrylic acid hydroxy-$C_2$–$C_4$-alkyl esters, acrylic or $C_1$–$C_4$-alkylacrylic acid-di-$C_1$–$C_4$-alkylamino-$C_2$–$C_4$-alkyl esters, acrylic or $C_1$–$C_4$-alkylacrylamides, N,N-di-$C_1$–$C_4$-alkyl substituted acrylic or $C_1$–$C_4$-alkylacrylamides, and acrylic or $C_1$–$C_4$-alkylacrylic acid anhydrides.

Specific examples of such monomers are styrene, 4-hydroxystyrene, α-methylstyrene, p-methylstyrene, 4-chlorostyrene, methyl, ethyl, n-butyl, isobutyl, tert.-butyl, 2-ethylhexyl, isobornyl, glycidyl, 2-hydroxyethyl or 2-dimethylaminoethylacrylate or the corresponding methacrylates, acrylic or methacrylic acid amide, or acrylic or methacrylic acid-N,N-dimethyl or -diethyl amide. Silicone acrylates are also advantageous.

x represents a numeral greater than one and defines the number of repeating units in A. The lowest number is two. A preferred range of x is from 2 to 1000.

The above-mentioned aliphatic monomers may also be present in the polymer as comonomers B, or as oligopolymer or polymer fragments B copolymerized with A.

y represents zero or a numeral greater than zero and defines the number of monomer, oligopolymer or polymer repeating units in B. A preferred range of y is from 0 to 1000.

A preferred group of aliphatic monomers is selected from the group consisting of styrene, acrolein, acrylonitrile, acrylic or $C_1$–$C_4$-alkylacrylic acid-$C_1$–$C_{18}$-alkyl esters, acrylic or $C_1$–$C_4$-alkylacrylic acid hydroxy-$C_2$–$C_4$-alkyl esters, acrylic or $C_1$–$C_4$-alkylacrylic acid-di-$C_1$–$C_4$-alkylamino-$C_2$–$C_4$-alkyl esters, acrylic or $C_1$–$C_4$-alkylacrylamides and acrylic or $C_1$–$C_4$-alkylacrylic acid anhydrides.

A particularly preferred group of aliphatic monomers is selected from the group consisting of styrene, acrylic or $C_1$–$C_4$-alkylacrylic acid-$C_1$–$C_4$-alkyl esters, acrylic or $C_1$–$C_4$-alkylacrylic acid hydroxy-$C_2$–$C_4$-alkyl esters, acrylic or $C_1$–$C_4$-alkylacrylic acid di-$C_1$–$C_4$-alkylamino-$C_2$–$C_4$-alkyl esters, and acrylic or $C_1$–$C_4$-alkylacrylamides, e.g. styrene, methyl, ethyl, n-butyl, isobutyl, tert.-butyl, 2-ethylhexyl, isobornyl, glycidyl, 2-hydroxyethyl or 2-dimethylaminoethyl(meth)acrylate, or (meth)acrylic acid amide.

Examples of monomers containing two or more double bonds are diacrylates of ethylene glycol, propylene glycol, neopentyl glycol, hexamethylene glycol or of bisphenol A, 4,4'-bis(2-acryloyloxyethoxy)-diphenylpropane, trimethylolpropane triacrylate or tetraacrylate or vinyl acetate.

A polymerizable aliphatic monomer containing ethylene groups is characterized by a relatively high molecular mass from about 500 to 3000. Suitable examples are acrylisized epoxy resins or acrylisized polyesters. Unsaturated oligomers of this kind may also be referred to as prepolymers.

In a polymer (I) one of $R_1$ and $R_2$ represents $C_1$–$C_7$-alkyl, and the other represents $C_1$14 $C_4$-alkyl or $C_1$–$C_4$-alkyl substituted by $C_1$–C4-alkoxycarbonyl or $C_1$–$C_4$-alkoxy; or $R_1$ and $R_2$ together with the adjacent carbon atom both represent $C_3$–$C_7$-cycloalkyl;

$R_3$ and $R_4$ are as defined as $R_1$ and $R_2$;

$R_a$ represents $C_1$–$C_4$-alkyl, cyano, $C_1$–$C_4$-alkoxycarbonyl, $C_1$–$C_4$-alkanoyloxy, $C_1$–$C_4$-alkanoyloxy-$C_1$–$C_4$-alkyl, carbamoyl, mono- or di-$C_1$–$C_4$-alkylcarbamoyl, mono- or di-2-hydroxyethylcarbamoyl, amidino, 2-imidazolyl, 1-hydroxy-2-hydroxymethyl-2-propylcarbamoyl, or 1,1-dihydroxymethyl-2-hydroxycarbamoyl; and $R_b$ is as defined as $R_a$; or $R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulfur, e.g. a piperidine, piperazine, morpholine or imidazolidine group. The heterocyclic group may also be condensed with a phenyl group. If $R_a$ and $R_b$ together represent a divalent group, $R_1$ and $R_2$ and $R_3$ and $R_4$ together may also represent oxygen (exo-substitution) or $R_5$ and $R_6$ or $R_7$ and $R_8$ together or $R_5$ and $R_6$ and $R_7$ and $R_8$ together represent oxygen.

In a polymer (I) the substituents $R_1$, $R_2$ and $R_a$ and $R_3$, $R_4$ and $R_b$ in a group of the partial formula

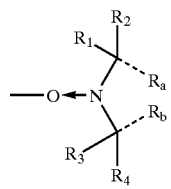

together with the adjacent carbon atom on the nitrogen atom preferably represent groups of the partial formulae

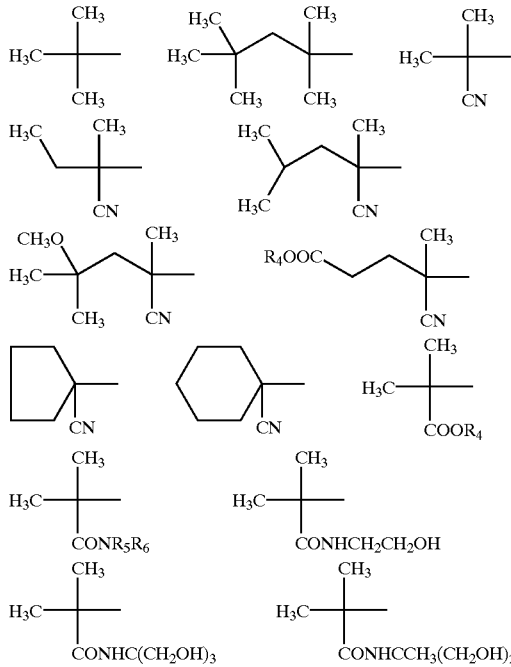

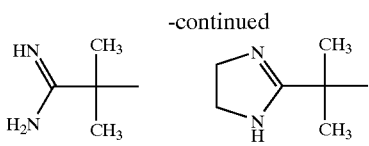

A preferred embodiment of the invention relates to the preparation of polymers (I), wherein one of $R_1$ and $R_2$ represents methyl and the other one represents methyl or ethyl and one of $R_3$ and $R_4$ represents methyl and the other one represents methyl or ethyl and $R_a$ and $R_b$ together represent a group of the formula

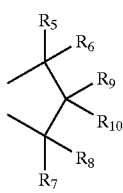

(A₀)

wherein $R_5$, $R_6$, $R_7$ and $R_8$ independently of one another represent hydrogen, methyl or ethyl; and one of $R_9$ and $R_{10}$ independently of the other represents hydrogen or substituents or $R_9$ and $R_{10}$ both represent substituents.

A particularly preferred embodiment of the present invention relates to a process for the preparation of a polymer of the formula

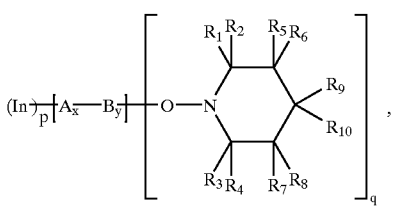

(IA)

wherein:

In represents a polymerization initiator fragment of a polymerization initiator II capable of initiating polymerization of monomers or oligopolymers containing ethylene groups;

p represents a numeral greater than zero and defines the number of initiator fragments;

A represents an oligopolymer or polymer fragment consisting of repeating units of polymerizable monomers or oligopolymers containing ethylene groups;

x represents a numeral greater than one and defines the number of repeating units in A;

B represents a monomer, oligopolymer or polymer fragment copolymerized with A;

y represents zero or a numeral greater than zero and defines the number of monomer, oligopolymer or polymer repeating units in B;

q represents a numeral greater than zero;

$R_1$, $R_2$, $R_3$ and R4 represent $C_1$–$C_4$-alkyl;

$R_5$, $R_6$, $R_7$ and $R_8$ represent hydrogen; and one of $R_9$ and $R_{10}$ independently of the other represents hydrogen or substituents or $R_9$ and $R_{10}$ both represent substituents, which comprises polymerizing by atom transfer radical polymerization (ATRP) an aliphatic monomer or oligomer containing ethylene groups in the presence of a polymerization initiator (II) having a radically transferable atom or group capable of initiating polymerization of monomers or oligopolymers containing ethylene groups and replacing the leaving group —X in a polymerisate (III) with a N→O compound of the formula

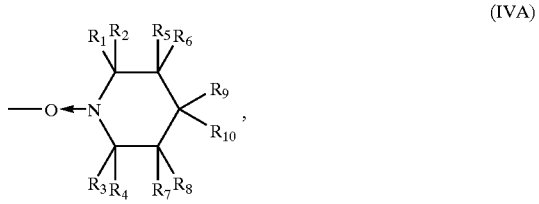

(IVA)

wherein $R_1$–$R_{10}$ are as defined above, in the presence of a catalytically effective amount of an oxidizable transition metal complex catalyst.

Another preferred embodiment of the present invention relates to the preparation of a polymer of the formula:

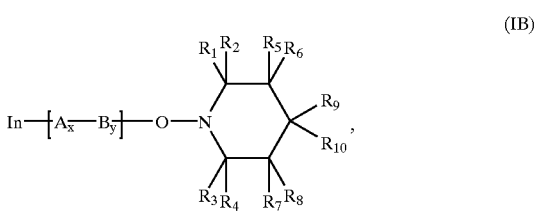

(IB)

wherein In, A, B, x, y, and $R_1$–$R_{10}$ are as defined above.

In the polymers (IA) and (IB) the cyclic N→O containing terminal group represents a group of the partial formula

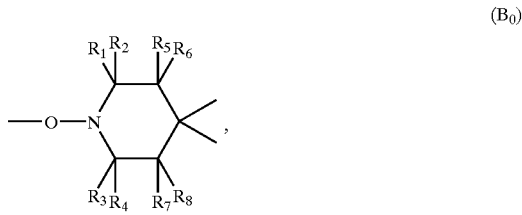

(B₀)

wherein $R_1$–$R_8$ are as defined above and the 4-position is substituted by one or two substituents. Preferred groups $B_0$ which contain substituents in 4-position are represented by the partial formulae

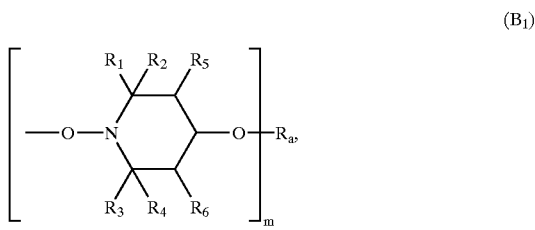

(B₁)

-continued

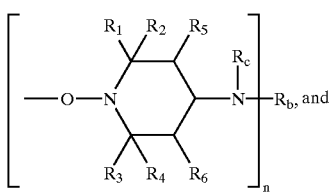

(B₂)

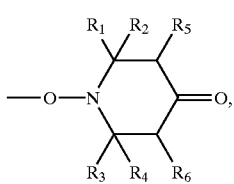

(B₃)

wherein

R1–R₆ are as defined above;

m represents a numeral from one to four;

n represents one, two or three;

if m represents one, $R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 18 carbon atoms, of a cycloaliphatic carboxylic acid having 7 to 15 carbon atoms, of an a,b-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COOZ groups, in which Z represents H, $C_1$–$C_{20}$-alkyl, $C_3$–$C_{12}$-alkenyl, $C_5$–$C_7$-cycloalkyl, phenyl or benzyl; or $R_a$ represents a monovalent radical of a carbamic acid or phosphorus-containing acid or a monovalent silyl radical; or if m represents 2, $R_a$ represents $C_2$–$C_{12}$-alkylene, $C_4$–$C_{12}$-alkenylene, xylylene, or represents a divalent radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms, where each dicarboxylic acid may be substituted in the aliphatic, cycloaliphatic or aromatic moiety by one or two —COOZ groups; or $R_a$ is a divalent radical of a phosphorus-containing acid or a divalent silyl radical; or if m represents 3, $R_a$ represents a trivalent radical of an aliphatic, cycloaliphatic or aromatic tricarboxylic acid, which may be substituted in the aliphatic, cycloaliphatic or aromatic moiety by —COOZ, of an aromatic tricarbamic acid or of a phosphorus-containing acid, or is a trivalent silyl radical; or if m represents 4, $R_a$ represents a tetravalent radical of an aliphatic, cycloaliphatic or aromatic tetra- carboxylic acid;

if n represents one, $R_b$ represents $C_1$–$C_{12}$-alkyl, $C_5$–$C_7$-cycloalkyl, $C_7$–$C_8$-aralkyl, $C_2$–$C_{18}$-alkanoyl, $C_3$–$C_5$-alkenoyl or benzoyl;

$R_c$ represents $C_1$–$C_{18}$-alkyl, $C_5$-$C_7$-cycloalkyl, $C_2$–$C_8$-alkenyl unsubstituted or substituted by a cyano, carbonyl or carbamide group, glycidyl or represents a group of the formulae —CH₂CH(OH)—Z, —CO—Z— or —CONH—Z wherein Z represents hydrogen, methyl or phenyl, or $R_b$ and $R_c$ together represent the cyclic acyl radical of an aliphatic or aromatic 1,2- or 1,3-dicarboxylic acid;

if n represents two, $R_b$ is as defined above; and $R_c$ represents $C_2$–$C_{12}$-alkylene, $C_6$–$C_{12}$-arylene, xylylene, a —CH₂CH(OH)CH₂—O—B—O—CH₂CH(OH)CH₂— group, wherein B represents $C_2$–$C_{10}$-alkylene, $C_6$–$C_{15}$-arylene or $C_6$–$C_{12}$-cycloalkylene; or, provided that $R_b$ is not alkanoyl, alkenoyl or benzoyl, $R_c$ represents a divalent acyl radical of an aliphatic, cycloaliphatic or aromatic dicarboxylic acid or dicarbamic acid, or represents the group —CO—; or $R_c$ represents a group of the partial formula

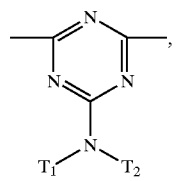

(C₀)

wherein $T_1$ and $T_2$ independently of the other represent hydrogen, $C_1$–$C_{18}$-alkyl, or $T_1$ and $T_2$ together represent $C_4$–$C_6$-alkylene or 3-oxapentamethylene; or if n represents 3, $R_c$ represents 2,4,6-triazinyl.

A highly preferred group $B_0$ which contains substituents in 4-position is selected from the group consisting of the partial formulae $B_1$ and $B_2$, wherein m represents 1;

$R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 12 carbon atoms, of a cycloaliphatic carboxylic acid having 7 to 15 carbon atoms, of an a,b-unsaturated carboxylic acid having 3 to 5 carbon atoms or of an aromatic carboxylic acid having 7 to 15 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_5$–$C_7$-cycloalkyl, $C_7$–$C_8$-aralkyl, $C_2$–$C_8$-alkanoyl, $C_3$–$C_5$-alkenoyl or benzoyl; and $R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl, or represents a group of the formula —CH₂CH(OH)—Z, —CO—Z or —CONH—Z, wherein Z is hydrogen, methyl or phenyl.

Another highly preferred group $B_0$ which contains substituents in 4-position is selected from the group consisting of the partial formulae $B_1$ and $B_2$, wherein m represents 1;

$R_a$ represents hydrogen, $C_1$–$C_{18}$-alkyl, 2-cyanoethyl, benzoyl, glycidyl, or a monovalent radical of an aliphatic carboxylic acid having 2 to 12 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_7$–$C_8$-aralkyl, $C_2$–$C_{18}$-alkanoyl, $C_3$–$C_5$-alkenoyl or benzoyl; and $R_c$ represents $C_1$–$C_{18}$-alkyl, glycidyl, a group of the formulae —$CH_2CH(OH)$—Z or —CO—Z, wherein Z is hydrogen, methyl or phenyl.

Another particularly preferred embodiment relates to the group $B_0$, wherein one of $R_9$ and $R_{10}$ represents hydrogen and the other one $C_1$–$C_4$-alkanoylamino.

An especially preferred embodiment of the present invention relates to the process for the preparation of a polymer (IA), wherein In represents a polymerization initiator fragment of a polymerization initiator capable of initiating polymerization of monomers or oligopolymers containing ethylene groups and which polymerization initiator is selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, o-haloacrylates and halolactones;

p represents one;

q represents a numeral from one to three;

A and B represent oligopolymer or polymer fragments containing repeating units of polymerizable monomers selected from the group consisting of styrene, acrolein, acrylonitrile, acrylic or $C_1$–$C_4$-alkylacrylic acid-$C_1$–$C_4$-alkyl esters, acrylic or $C_1$–$C_4$-alkylacrylic hydroxy-$C_2$–$C_4$-alkyl esters, acrylic acid or $C_1$–$C_4$-alkylacrylic di-$C_1$–$C_4$-alkylamino-$C_2$–$C_4$-alkyl esters, acrylic or $C_1$–$C_4$-alkylacrylamides and acrylic or $C_1$–$C_4$-alkylacrylic acid anhydrides;

x and y represent numerals greater than one;

$R_1$, $R_2$, $R_3$ and $R_4$ represent methyl;

$R_5$, $R_6$, $R_7$ and $R_8$ represent hydrogen;

the cyclic N→O fragment in formula IA represents structural embodiments selected from the group consisting of the partial formulae $B_1$ and $B_2$, wherein m represents 1;

$R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 18 carbon atoms, of a cycloaliphatic carboxylic acid having 7 to 15 carbon atoms, or an a,b-unsaturated carboxylic acid having 3 to 5 carbon atoms or of an aromatic carboxylic acid having 7 to 15 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_5$–$C_7$-cycloalkyl, $C_7$–$C_8$-aralkyl, $C_2$–$C_{18}$alkanoyl, $C_3$–$C_5$-alkenoyl or benzoyl; and $R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl, or represents a group of the formulae —$CH_2CH(OH)$—Z, —CO—Z or —CONH—Z wherein Z is hydrogen, methyl or phenyl.

A most preferred embodiment of the present invention relates to the process for the preparation of the polymer (IA), wherein In represents the polymerization initiator fragment of a polymerization initiator capable of initiating polymerization of monomers or oligopolymers containing ethylene groups and which polymerization initiator is selected from the group consisting of $C_1$–$C_8$-alkylhalides, $C_6$–$C_{15}$-aralkylhalides, $C_2$–$C_8$-haloalkyl esters, arene sulfonyl chlorides, haloalkanenitriles, α-haloacrylates and halolactones;

p and q represent one;

A and B represent oligopolymer or polymer fragments containing repeating units of polymerizable monomers selected from the group consisting of styrene, acrylic or $C_1$–$C_4$-alkylacrylic acid-$C_1$–$C_4$-alkyl esters, acrylic or $C_1$–$C_4$-alkylacrylic acid hydroxy-$C_2$–$C_4$-alkyl esters, acrylic or $C_1$–$C_4$-alkylacrylic acid di-$C_1$–$C_4$-alkylamino-$C_2$–$C_4$-alkyl esters, and acrylic or $C_1$–$C_4$-alkylacrylamides;

x and y represent numerals greater than one;

$R_1$, $R_2$, $R_3$ and $R_4$ represent methyl;

$R_5$, $R_6$, $R_7$ and $R_8$ represent hydrogen;

the cyclic N→O fragment in formula IA represents structural embodiments selected from the group consisting of the partial formulae $B_1$ and $B_2$, wherein m represents 1;

$R_a$ represents hydrogen, $C_1$–$C_{18}$-alkyl, 2-cyanoethyl, benzoyl, glycidyl, a monovalent radical of an aliphatic, carboxylic acid having 2 to 12 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_7$–$C_8$-aralkyl, $C_2$–$C_{18}$-alkanoyl, $C_3$–$C_5$-alkenoyl or benzoyl; and $R_c$ represents $C_1$–$C_{18}$alkyl, glycidyl, or a group of the formula —$CH_2CH(OH)$—Z or —CO—Z, wherein Z is hydrogen, methyl or phenyl.

The (co)polymers (I) as obtained by the process of the present invention typically have a low polydispersity. Preferably the polydispersity is from 1.01 to 2.2, more preferably from 1.01 to 1.9 and most preferably from 1.01 to 1.5.

In the context of the description of the present invention, the term alkyl comprises methyl, ethyl and the isomers of propyl, butyl, pentyl, hexyl, heptyl, octyl, nonyl, decyl, undecyl and dodecyl. An example of aryl-substituted alkyl is benzyl. Examples of alkoxy are methoxy, ethoxy and the isomers of propoxy and butoxy. Examples of alkenyl are vinyl and allyl. An example of alkylene is ethylene, n-propylene or 1,2-propylene.

Some examples of cycloalkyl are cyclopropyl, cyclobutyl, cyclopentyl, cyclohexyl, methylcyclopentyl, dimethylcyclopentyl and methylcyclohexyl. Examples of substituted cycloalkyl are methyl-, dimethyl-, trimethyl-, methoxy-, dimethoxy-, trimethoxy-, trifluoromethyl-, bis-trifluoromethyl- and tris-trifluoromethyl-substituted cyclopentyl and cyclohexyl.

Examples of aryl are phenyl and naphthyl. Examples of aryloxy are phenoxy and naphthyloxy. Examples of substituted aryl are methyl-, dimethyl-, trimethyl-, methoxy-, dimethoxy-, trimethoxy-, trifluoromethyl-, bis-trifluoromethyl- or tris-trifluoromethyl-substituted phenyl.

An example of aralkyl is benzyl. Examples of substituted aralkyl are methyl-, dimethyl-, trimethyl-, methoxy-, dimethoxy-, trimethoxy-, trifluoromethyl-, bis-trifluoromethyl or tris-trifluoromethyl-substituted benzyl.

Some examples of an aliphatic carboxylic acid are acetic, propionic or butyric acid. An example of a cycloaliphatic carboxylic acid is cyclohexanoic acid. An example of an aromatic carboxylic acid is benzoic acid. An example of a phosphorus-containing acid is methylphosphonic acid. An example of an aliphatic dicarboxylic acid is malonyl, maleoyl or succinyl. An example of an aromatic dicarboxylic acid is phthaloyl.

The term heterocycloalkyl embraces one or two and heteroaryl from one to four heteroatoms, the heteroatoms being selected from the group consisting of nitrogen, sulfur and oxygen. Some examples of heterocycloalkyl are tetrahydrofuryl, pyrrolidinyl, piperazinyl and tetrahydrothienyl. Some examples of heteroaryl are furyl, thienyl, pyrrolyl, pyridyl and pyrimidinyl.

An example of a monovalent silyl radical is trimethylsilyl.

The process may be carried out in the presence of water or an organic solvent or mixtures thereof. Additional cosolvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerizate.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether, tetrahydrofurane), or mixtures thereof.

If water is used as a solvent the reaction mixture can be supplemented with a water-miscible or hydrophilic cosolvent. The reaction mixture will then remain in a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until full completion of the polymerization. Exemplary cosolvents useful in the process may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to cosolvent weight ratio is typically in the range of about 100:0 to about 10:90.

When monomer mixtures or monomer/oligomer mixtures are used, the calculation of mol % is based on an average molecular weight of the mixture.

Hydrophilic monomers, polymers and copolymers of the present invention can be separated from one another or from the polymerization reaction mixture by, for example, distillation, precipitation, extraction, changing the pH of the reaction media or by other well known conventional separation techniques.

The polymerization temperature may range from about 50° C. to about 180° C., preferably from about 80° C. to about 150° C. At temperatures above about 180° C., the controlled conversion of the monomers into polymers may decrease, and undesirable by-products like thermally initiated polymers are formed or decomposition of the components may occur.

The transition metal in the oxidizable transition metal complex catalyst salt used in the process of the invention is present as an oxidizable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions ($H^+$) or anions derived from inorganic or organic acids, examples being halides, e.g. $F^+$, $Cl^+$, $Br^+$ or $I^+$, fluoro complexes of the type $BF_4^+$, $PF_6^+$, $SbF_6^+$ or $AsF_6^+$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$–$C_8$ carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$–$C_4$ alkyl-, $C_1$–$C_4$ alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$–$C_8$-carboxylic acid, for example formate, acetate, propionate, butyrate, benzoate, phenylacetate, mono-, di- or trichloro- or -fluoroacetate, and also $C_1$–$C_{12}$-alcoholates, such as straight chain or branched $C_1$–$C_{12}$-alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$–$C_4$ alkyl$)_4 N^+$.

Suitable neutral ligands are inorganic or organic neutral ligands commonly known in complex chemistry of transition metals. They coordinate to the metal ion through a σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i\text{-}C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)- ethylenediamine (Me₆TREN), catechol, N, N'-dimethyl-1,2-benzenediamine, 2-(methylamino)phenol, 3-(methylamino)-2-butanol or N,N'-bis(1,1-dimethylethyl)-1,2-ethanediamine, N,N,N',N",N"-pentamethyldiethyltriamine (PMDETA), $C_1$–$C_8$-glycols or glycerides, e.g. ethylene or propylene glycol or derivatives thereof, e.g. di-, tri- or tetraglyme, and monodentate or bidentate heterocyclic e⁻ donor ligands.

Heterocyclic e⁻ donor ligands are derived, for example, from unsubstituted or substituted heteroarenes from the group consisting of furan, thiophene, pyrrole, pyridine, bis-pyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, Me₆TREN or PMDETA.

After completing the polymerizing step process, the polymers obtained may be isolated or the N→O compound (IV) is added in-situ. The isolating step of the present process may be carried out by known procedures, e.g. by distilling and filtering off unreacted monomer. After completing the substitution of the polymerisate with the N→O compound (IV), the catalyst salt is filtered off, followed by evaporation of the solvent or by precipitation of the N→O polymer (I) in a suitable liquid phase, filtering the precipitated polymer and washing and drying, The elimination of the leaving group —X and the substitution of the polymerisate with the N→O (IV) is advantageously performed in such a way that the polymerisate is dissolved in a solvent and the N→O compound (IV) is added. The reaction takes place within a temperature range from room temperature to the boiling temperature of the reaction mixture, preferably from room temperature to 100° C. The transition metal in the oxidizable transition metal complex catalyst salt is converted from its lower oxidation state in the above-mentioned redox systems to its higher oxidation state. In a preferred embodiment of the process a Cu(I) complex catalyst salt is converted to a to the corresponding Cu(II) oxidation state.

Because the present polymerization and derivatization with the N→O compound (IV) by ATRP is a "living" polymerization, it can be started and terminated practically at will. The various advantages of the process of this type allowing flexible polymerization reactions are described by K. Matyjaszewski in *ACS Symp.Ser.* Vol. 685 (1998), pg. 2–30. Thus, in one embodiment of this invention, once the first monomer is consumed in the initial polymerizing step, a second monomer can then be added to form a second block on the growing polymer chain in a second polymerization step. Therefore it is possible to carry out additional polymerizations with the same or different monomer(s) to prepare multi-block copolymers. Furthermore, since this is a radical polymerization, blocks can be prepared in essentially any order. One is not necessarily restricted to prepare block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)acrylate block is prepared first, then a styrene block is attached thereto, and so on.

Furthermore, there is no linking group required for joining the different blocks of the present block copolymer. One can simply add successively monomers to form successive blocks.

The polymers or copolymers can be further processed and used in most cases without any further purification step. This is an important advantage when industrial scale-up is intended.

Another embodiment of the present invention are the polymers, copolymers or oligomers obtainable by the process described above.

Another embodiment of the present invention is a polymer composition which comprises a) a polymer, copolymer, or oligomer obtainable by the process mentioned above; and b) a polymer or oligomer of the formula

wherein

A represents an oligopolymer or polymer fragment consisting of repeating units of polymerizable monomers or oligopolymers containing ethylene groups;

x represents a numeral greater than one and defines the number of repeating units in A;

B represents a monomer, oligopolymer or polymer fragment copolymerized with A; and y represents zero or a numeral greater than zero and defines the number of monomer, oligopolymer or polymer repeating units in B.

The polymers obtained by the process of the present invention and the compositions mentioned above may contain in addition to the components mentioned above conventional additives such as antioxidants or light stabilizers may be added in a small quantities, such as UV absorbers, for example those of the hydroxyphenylbenzotriazole, hydroxyphenyl-benzophenone, oxalamide or hydroxyphenyl-s-triazine type. These compounds can be added individually or in mixtures, with or without sterically hindered amines (HALS).

The composition may contain the above-mentioned polymer or oligomer components in an amount of 0.01 to 99% by weight, preferably 0.1 to 95% by weight, particularly preferably 1 to 90% by weight, and especially preferably 5 to 80% by weight, based on the monomers present in the composition.

The polymers obtained by the process of the present invention and the compositions mentioned above are useful as adhesives, detergents, dispersants, emulsifiers, surfactants, defoamers, adhesion promoters, corrosion inhibitors, viscosity improvers, lubricants, rheology modifiers, thickeners, crosslinkers, paper treatment compositions, water treatment compositions, electronic materials, paints, coatings, ink materials, imaging materials, superabsorbants, cosmetics, hair products, preservatives, biocide materials or modifiers for asphalt, leather, textiles, ceramics and wood.

N→O compounds of the formula IV are known. They are commercially available or can be prepared according to the methods as described in U.S. Pat. No. 5,204,473 or U.S. Pat. No. 4,581,429 and the references cited therein.

THE FOLLOWING EXAMPLES ILLUSTRATE THE INVENTION

EXAMPLE 1 a) Substitution of terminal bromine in high molecular weight poly-n-butylacrylate (1) with terminal N→O:

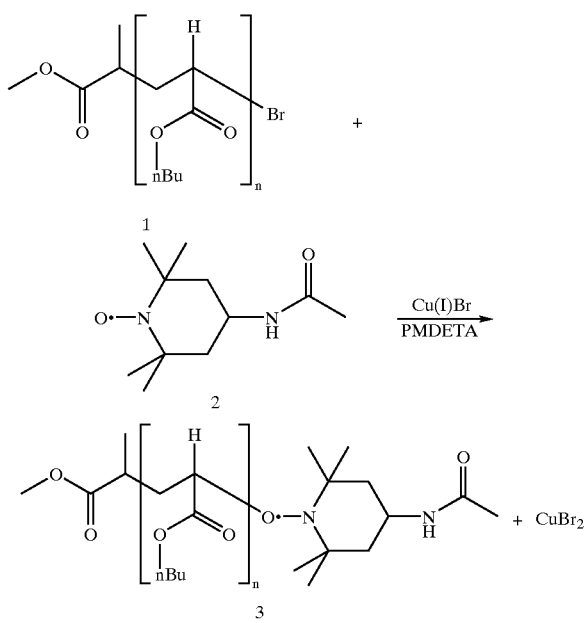

1 is a polymer prepared by the ATRP method from methyl-2-bromopropionate (initiator), n-butylacrylate (monomer) and Cu(I)Br/N,N,N',N'',N''-pentamethyl-diethylene-triamine (PMDETA=catalyst and ligand). Its preparation is described in Example 1 c).

10.0 g (1.48 mmol polymer with terminal bromine) 1, 0.315 g (1.48 mmol) 2, 0.212 g (1.48 mmol) CuBr and 10 ml ethylacetate solvent are added to a 100 ml round flask equipped with a magnetic stirrer. The flask is then rubber sealed. The air is removed from the flask by stirring and evacuating and rinsing with nitrogen three times. 0.256 g (310 μl, 1.48 mmol) PMDETA are added through the rubber sealing with a syringe. The solution is then heated at 80° C. for two hours in an oil bath. The color of the reaction mixture changes from orange to brownish and then to greenish. After cooling to room temperature the insoluble greenish Cu-complex catalyst particles are filtered off. By addition of 3 g neutral aluminum oxide (ALOX for chromatography, Merck) and filtration the complex catalyst is completely removed. After drying in the rotary evaporator at 60° C. and then in the vacuum pump a colorless polymer is obtained in almost quantitative yield.

Elementary analysis: Br: <0.3%, N: 0.36% (0.41% calc. for 100% exchange of halogen); GPC (THF): $M_n$: 5980, $M_w$: 7010, PDI: 1.17.

b) In a reaction analogous to a) the solvent dioxan is used. The process is carried out for 3 h at 100° C. Drying is at 100° C.

Elementary analysis: Br: <0.3%, N: 0.39% (0.41% calc, for 100% exchange of halogen); GPC (THF): $M_n$: 5950, $M_w$: 6990, PDI: 1.17.

Both reactions a) and b) demonstrate that more than 75% of the terminal halogen has been substituted with terminal N→O. The data for nitrogen from the elementary analysis reveal that the degree of substitution is actually higher than 88%.

c) Preparation of poly-n-butylacrylate (1) with terminal Br-groups by the ATRP method without the addition of solvent ([M]:[I]:[CuBr]:[L]=50:1:0.2:0.2).

89.8 g (100l, 0.7 mol) n-butylacrylate (Fluka, purum) and 0.40 g (2.8 mmol) CuBr (Fluka, purified by treatment with acetic acid) are added to a 500 ml round flask equipped with a magnetic stirrer. The air is removed from the flask by stirring and evacuating and rinsing with nitrogen three times. 0.485 g (0.58 ml, 2.8 mmol) PMDETA are added through the rubber sealing with a syringe. After addition of 2.34 g (1.56 ml, 14 mmol) methyl-2-bromo-propionate (initiator) and heating up to 80° C. in the oil bath the exothermal polymerization reaction is started. The temperature rises within 30 min. to 91° C. The amount produced is determined by $^1$H-NMR-analysis in $CDCl_3$ (56%, 30 min.; 80%, 1 h.; 90%, 2 h). After cooling to room temperature 150 ml ethyl acetate and 30 g neutral aluminum oxide (ALOX for chromatography, Merck) are added. The polymer is obtained after stirring for 1 h at room temperature, filtration and drying in the rotary evaporator at 80° C. and drying in the vacuum pump.

Yield: 84 g (93%); Elementary analysis: Br: <1.18%, Cu: <10 ppm (X-ray fluorescence); GPC (THF): $M_n$: 5640 (5920 calc.), $M_w$: 6790, PDI: 1.20.

EXAMPLE 2 a) Substitution of terminal bromine in low molecular weight poly-n-butylacrylate (1) with terminal N→O. The substitution is carried out in a manner analogous to Ex. 1 a).

TABLE 1

| Equiv. NO● 2 added | Temp.; time | $M_n$; PDI | Elementary analysis Br; N [%] | Degree [%] of substitution (Br-analysis) | Degree [%] of substitution (UV-analysis of NO●) |
|---|---|---|---|---|---|
| 1.14 | 80° C. 0.5 h | 1430 1.18 | <0.3; 1.75 | >94% (99%*) | >90% |
| 1.00 | 80° C. 0.5 h | 1410 1.17 | 0.84; 1.40 | 83% (79%*) | — |
| 1.14 | 60° C. 2.0 h | 1410 1.18 | <0.3; 1.66 | >94% (94%*) | — |
| 0.50 | 60° C. 2.0 h | 1350 1.19 | 2.61; 0.74 | 54% (42%*) | — |
| 1.00 | 60° C. 2.0 h | 1430 1.17 | 0.42; 1.47 | 91% (83%*) | — |

*calculated from N-elementary analysis (N-content after complete substitution: 1.77%).

b) Preparation of low molecular weight poly-n-butylacrylate (1) with terminal Br-groups by ATRP with the addition of solvent ([M]:[I]:[CuBr]:[L]=10:1:0.2:0.2).

160.2 g (1.25 mol) n-butylacrylate (Fluka, purum), 3.58 g (25 mmol) CuBr (Fluka, purified by treatment with acetic acid) and 152 ml dioxan (Fluka, puriss.) are added to a 500 ml round flask equipped with a magnetic stirrer. The air is removed from the flask by stirring and evacuating and rinsing with nitrogen three times. 4.33 g (25 mmol) PMDETA are added through the rubber sealing with a syringe. After addition of 20.87 g (0.125 mol) methyl-2-bromo-propionate (initiator) and heating up to 70° C. in the oil bath the exothermal polymerization reaction is started. The temperature slowly rises to 90–100° C. The reaction mixture is briefly cooled in an ice bath to keep the temperature between 90 and 95° C. The reaction is terminated after about 30 minutes which is determined by $^1$H-NMR-analysis in $CDCl_3$ (>98° C.). After cooling to room temperature 100 ml dioxan and 150 g neutral aluminum oxide (ALOX for chromatography, Merck) are added. The polymer is obtained as a colorless, viscous liquid after stirring for 30 min. at room temperature, filtration, drying in the rotary evaporator at 60° C. and drying in the vacuum pump.

Yield: 143 g (79%); Elementary analysis: Br: 4.85%; GPC (THF): $M_n$: 1280 (1282 calc.), $M_w$: 1540, PDI: 1.20.

EXAMPLE 3

Substitution of 2 terminal bromine atoms in low molecular weight poly-n-butylacrylate (1) with two interlinked terminal N→O.

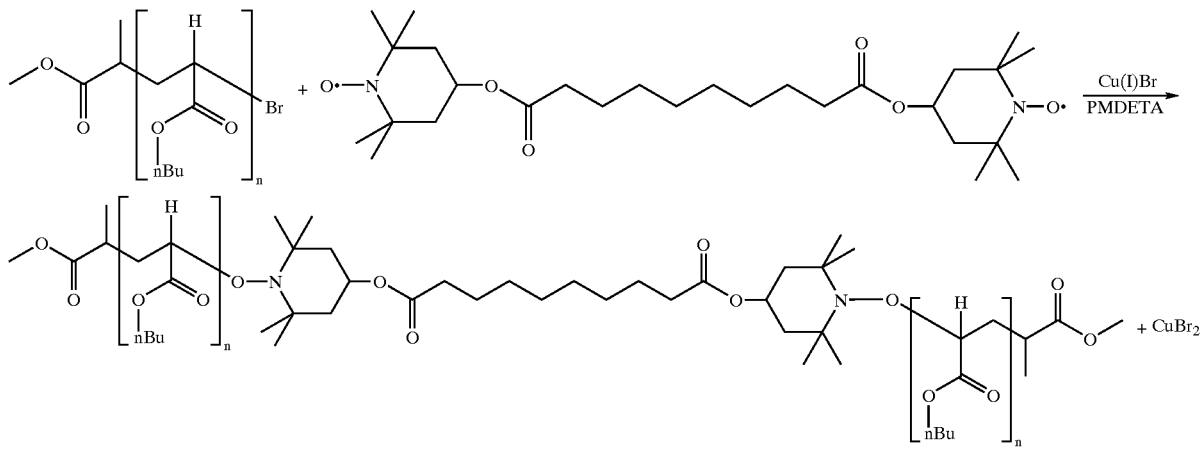

The substitution is carried out in a manner analogous to Ex. 1 a). The preparation of low molecular weight poly-n-butylacrylate (1) is carried out analogous to Ex. 2 b).

TABLE 2

| Equiv. NO• added | Temp.; time | $M_n$; PDI | Elementary analysis Br; N [%] | Degree [%] of substitution (Br-analysis) |
|---|---|---|---|---|
| 1.14 | 60° C. 0.5 h | 2090 1.26 | 0.49; 0.67 | 90% (75%*) |

*calculated value according to N-analysis

EXAMPLE 4 a) Substitution of terminal chlorine in low molecular weight poly-n-butylacrylate (4) with terminal N→O:

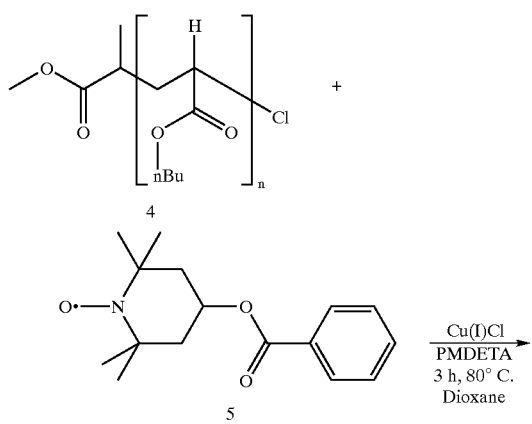

-continued

[structure 6]

+ CuCl$_2$ 5.0 g (3.55 mmol terminal Cl) 4, 0.982 g (3.55 mmol) 5 and 0.351 g (3.55 mmol) CuCl are mixed under nitrogen with 5.0 ml dioxan in a three-necked round flask equipped with a magnetic stirrer. The air is removed from the flask by stirring and evacuating and rinsing with nitrogen three times. The mixture is heated in the oil bath to 50° C. When 0.615 g (3.55 mmol) PMDETA are added, the color of the reaction mixture changes from orange to green. After cooling to room temperature the reaction mixture is filtered and 10 ml dioxan and 2×5 g neutral aluminum oxide (ALOX for chromatography, Merck) are added. After filtration, the polymer 6 is obtained after drying for 1.5 h in the rotary evaporator at 60° C.

| Yield: 5.41 g (92%); Elementary analysis: | | | |
|---|---|---|---|
| C | H | N | Cl |
| 65.70[1] | 9.13[1] | 0.85[1] | 0.00[1] |
| 65.60[2] | 9.07[2] | 0.81[2] | 0.30[2] |

[1]calculated;
[2]found;

A degree of substitution of >84% is calculated from the Cl-analysis; GPC (THF, PS-Standard): $M_n$: 1700 (17330 calc.); PDI: 1.83.

b) Preparation of poly-n-butylacrylate (1) with terminal Cl-groups with the addition of solvent ([M]:[I]:[CuBr]:[L]= 10:1:0.2:0.2).

160.2 g (1.25 mmol) n-butylacrylate (Fluka, purum) and 2.47 g (25 mmol) CuCl (Fluka, purified by treatment with acetic acid) are added to a 750 ml round flask equipped with a mechanic stirrer. 152 ml dioxan are added and the air is removed from the flask by stirring and evacuating and rinsing with nitrogen three times.

4.33 g (25 mmol) PMDETA are added through the rubber sealing with a syringe. After addition of 15.32 g (125 mmol) methyl-2-chloropropionate (initiator) and heating up to 80° C. in the oil bath the exothermal polymerization reaction is started. The temperature rises within minutes to 100° C. After 30 min. the amount produced is determined by $^1$H-NMR-analysis in CDCl$_3$ (100%). 100 ml dioxan and 150 g neutral aluminum oxide (ALOX for chromatography, Merck) are added. The polymer is obtained after stirring for 30 min. at room temperature, filtration and drying in the rotary evaporator at 80° C. and drying in the vacuum pump.

Yield: 155.6 g (89%); Elementary analysis: Cl: <1.92%, N: 0%; GPC (THF): $M_n$: 1490 (1400 calc.), $M_w$: 1490, PDI: 1.87.

EXAMPLE 5

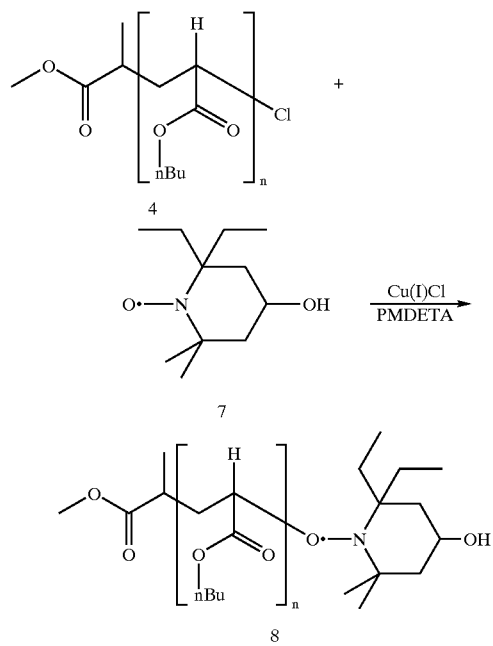

a) 5.0 g (2.7 mmol terminal Cl) 4, 0.54 g (2.7 mmol) 7 and 0.267 g (2.7 mmol) CuCl are mixed under nitrogen with 5.0 ml dioxan in a three-necked round flask equipped with a magnetic stirrer. The air is removed from the flask by stirring and evacuating and rinsing with nitrogen three times. The flask is then rubber sealed and 0.467 g (2.7 mmol) PMDETA are added through the rubber seal with a syringe. The mixture is heated in the oil bath to 90° C., whereas the color of the reaction mixture changes from orange over brown to green. After cooling to room temperature the insoluble greenish Copper complexes are filtered off. After addition of 10 ml dioxan and 5 g neutral aluminum oxide (ALOX for chromatography, Merck) and another filtration the catalyst residues are removed. After drying at 60° C. in the rotary evaporator the colorless polymer 8 is obtained.

| N | Cl |
|---|---|
| 0.81[1] | 0.00[1] |
| 0.86[2] | 0.18[2] |

Yield: 4.27 g (81%);
Elementary analysis:

[1]calculated;
[2]found

A degree of substitution of >90% is calculated from the Cl-analysis; GPC (THF, PS-Standard): $M_n$: 1760 (1700 calc.); PDI: 1.72; $M_w$: 3030 b) In a manner analogous to Example 5 a) a polymer is obtained, but the N→O compound is replaced with

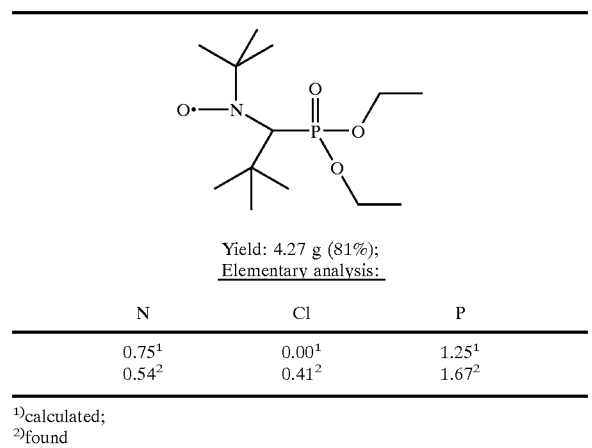

Yield: 4.27 g (81%);
Elementary analysis:

| N | Cl | P |
|---|---|---|
| 0.75[1] | 0.00[1] | 1.25[1] |
| 0.54[2] | 0.41[2] | 1.67[2] |

[1)]calculated;
[2)]found

A degree of substitution of >80% is calculated from the Cl-analysis; GPC (THF, PS-Standard): $M_n$: 1760 (1630 calc.); PDI: 1.72; $M_w$: 3040.

EXAMPLE 6

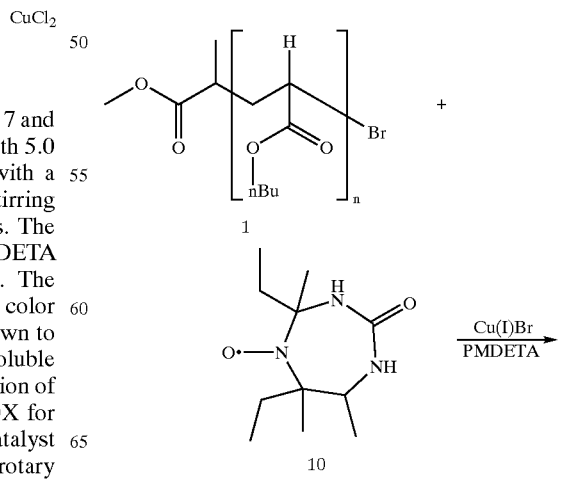

-continued

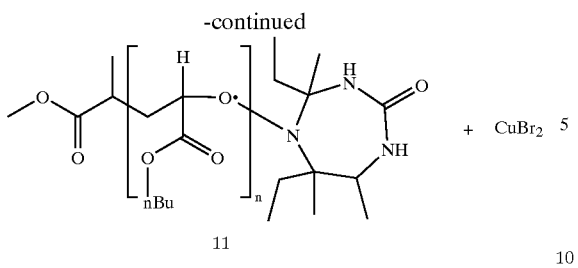

11

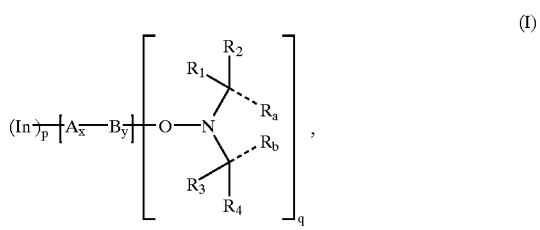

(I)

a) 5.0 g (3.3 mmol polymer with terminal bromine) 1, 0.75 g (3.3 mmol) 10 and 0.47 g (3.3 mmol) CuBr and 5 ml ethylacetate solvent are added to a 50 ml flask equipped with a magnetic stirrer. The flask is then rubber sealed. The air is removed from the flask by stirring and evacuating and rinsing with nitrogen three times. 0.55 g (3.3 mmol) PMDETA are added through the rubber sealing with a syringe. The solution is then heated at 90° C. for three hours in an oil bath. The color of the reaction mixture changes from orange to brownish and then to greenish. After cooling to room temperature the insoluble greenish Cu-complex catalyst particles are filtered off. By addition of 10 ml dioxan, 3 g neutral aluminum oxide (ALOX for chromatography, Merck) and filtration the complex catalyst is completely removed. After drying in the rotary evaporator at 60° C. and then in the vacuum pump a colorless polymer is obtained. The halogen exchange is higher than 93%.

Elementary analysis: Br: 1.34% (0% calc.), N: 1.60% (1.72% calc. for 100% exchange of halogen); GPC (THF): $M_n$: 1410 (1390 calc.), $M_w$: 1690, PDI: 1.20.

b) In a manner analogous to Example 5 a) a polymer is obtained, but the N→O compound is replaced with

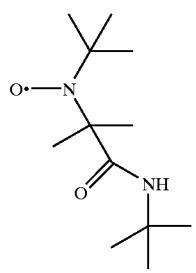

Yield: 4.83 g (84%);
Elementary analysis:

| N | Br |
|---|---|
| 1.60[1] | 1.49[1] |
| 1.71[2] | 1.60[2] |

[1]calculated;
[2]found

A degree of substitution of >94% is calculated from the N-analysis; GPC (THF, PS-Standard): $M_n$: 1360 (1380cac.); PDI: 1.19; $M_w$: 1620.

What is claimed is:
1. A process for the preparation of a polymer of the formula wherein:
In represents a polymerization initiator fragment of a polymerization initiator capable of initiating polymerization of monomers or oligopolymers containing ethylene groups;
p represents a numeral greater than zero and defines the number of initiator fragments;
A represents an oligopolymer or polymer fragment consisting of repeating units of polymerizable monomers or oligopolymers containing ethylene groups;
x represents a numeral greater than one and defines the number of repeating units in A;
B represents a monomer, oligopolymer or polymer fragment copolymerized with A;
y represents zero or a numeral greater than zero and defines the number of monomer, oligopolymer or polymer repeating units in B;
q represents a numeral greater than zero;
one of $R_1$ and $R_2$ represents $C_1$–$C_7$-alkyl and the other represents $C_1$–$C_4$-alkyl or $C_1$–$C_4$-alkyl substituted by $C_1$–$C_4$-alkoxycarbonyl or $C_1$–$C_4$-alkoxy; or
$R_1$ and $R_2$ together with the adjacent carbon atom both represent $C_3$–$C_7$-cycloalkyl;
$R_3$ and $R_4$ are as defined as $R_1$ and $R_2$;
$R_a$ represents $C_1$–$C_4$-alkyl, cyano, $C_1$–$C_4$-alkoxycarbonyl, $C_1$–$C_4$-alkanoyloxy, $C_1$–$C_4$-alkanoyloxy-$C_1$–$C_4$-alkyl, carbamoyl, mono- or di-$C_1$–$C_4$-alkylcarbamoyl, mono- or di-2-hydroxyethylcarbamoyl, amidino, 2-imidazolyl, 1-hydroxy-2-hydroxymethyl-2-propylcarbamoyl, or 1,1-dihydroxymethyl-2-hydroxycarbamoyl; and
$R_b$ is as defined as $R_a$; or
$R_a$ and $R_b$ together represent a divalent group and form a 5-, 6-, 7- or 8-membered aliphatic or aromatic heterocyclic group, which may contain 1–3 additional heteroatoms selected from the group consisting of nitrogen, oxygen and sulfur;
with the proviso that compounds of the formula I, wherein $R_1$, $R_2$, $R_3$ and $R_4$ represents methyl and $R_a$ and $R_b$ represents 1,3-propylene is excluded;
which comprises
polymerizing by atom transfer radical polymerization (ATRP) an aliphatic monomer or oligomer containing ethylene groups in the presence of a polymerization initiator of the formula:

$$[In\text{-}_p X_q \quad\quad (II),$$

wherein p and q are as defined above, In represents a radically transferable atom or group capable of initiating polymerization of monomers or oligopolymers containing ethylene groups and —X represents a leaving group; and replacing —X in a polymerisate of the formula $$(In)_{\overline{p}}[A_x\text{—}B_y]X_q \qquad (III),$$

wherein In, X, A, B, x, y, and p and q are as defined above, with a N→O compound of the formula $$\begin{array}{c} R_2 \\ R_1 \diagdown \vert \diagup R_a \\ \text{——O} \leftarrow N \\ R_3 \diagup \vert \diagdown R_b \\ R_4 \end{array} \qquad (IV)$$

wherein $R_1$–$R_4$ and $R_a$ and $R_b$ are as defined above, in the presence of a catalytically effective amount of an oxidizable transition metal complex catalyst.

2. A process according to claim 1 for the preparation of a polymer of the formula I, wherein
  p represents one;
  q represents a numeral from one to three; and
  In, A, B, x, y, $R_1$–$R_4$ and $R_a$ and $R_b$ are as defined in claim 1.

3. A process according to claim 1 for the preparation of a polymer of the formula I, wherein
  In represents the polymerization initiator fragment of a polymerization initiator (II) capable of initiating polymerization of monomers or oligopolymers containing ethylene groups and which polymerization initiator is selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-haloacrylates and halolactones,
  p and q represent one; and
  A, B, x, y, $R_1$–$R_4$, $R_a$ and $R_b$ are as defined in claim 1.

4. A process according to claim 1 for the preparation of a polymer of the formula I, wherein
  A and B represent oligopolymer or polymer fragments containing repeating units of polymerizable monomers selected from the group consisting of styrene, acrolein, acrylonitrile, acrylic or $C_1$–$C_4$-alkylacrylic acid-$C_1$–$C_{18}$-alkyl esters, acrylic or $C_1$–$C_4$-alkylacrylic acid hydroxy-$C_2$–$C_4$-alkyl esters, acrylic or $C_1$–$C_4$-alkylacrylic acid-di-$C_1$–$C_4$-alkylamino-$C_2$–$C_4$-alkyl esters, acrylic or $C_1$–$C_4$-alkylacrylamides and acrylic or $C_1$–$C_4$-alkylacrylic acid anhydrides; and
  In, p, q, x, y, $R_1$–$R_4$, $R_a$ and $R_b$ are as defined in claim 1.

5. A process according to claim 1 for the preparation of a polymer of the formula I, wherein one of $R_1$ and $R_2$ represents methyl and the other one represents methyl or ethyl and one of $R_3$ and $R_4$ represents methyl and the other one represents methyl or ethyl and $R_a$ and $R_b$ together represent a group of the formula $$\begin{array}{c} R_5 \\ \diagup R_6 \\ \diagdown R_9 \\ \diagup R_{10}, \\ \diagdown R_8 \\ R_7 \end{array} \qquad (A_0)$$

wherein
  $R_5$, $R_6$, $R_7$ and $R_8$ independently of one another represent hydrogen, methyl or ethyl; and one of $R_9$ and $R_{10}$ independently of the other represents hydrogen or substituents or $R_9$ and $R_{10}$ both represent substituents.

6. A process according to claim 1 for the preparation of a polymer of the formula $$\left[ (In)_{\overline{p}}[A_x\text{—}B_y]\text{—O}\!\!-\!\!\begin{array}{c} R_2 \; R_5 \\ R_1 \diagdown \diagup R_6 \\ \diagdown R_9 \\ \diagup R_{10} \\ R_3 \diagup \diagdown R_8 \\ R_4 \; R_7 \end{array} \right]_q \qquad (IA)$$

wherein:
  In represents a polymerization initiator fragment of a polymerization initiator (II) capable of initiating polymerization of monomers or oligopolymers containing ethylene groups;
  p represents a numeral greater than zero and defines the number of initiator fragments;
  A represents an oligopolymer or polymer fragment consisting of repeating units of polymerizable monomers or oligopolymers containing ethylene groups;
  x represents a numeral greater than one and defines the number of repeating units in A;
  B represents a monomer, oligopolymer or polymer fragment copolymerized with A;
  y represents zero or a numeral greater than zero and defines the number of monomer, oligopolymer or polymer repeating units in B;
  q represents a numeral greater than zero;
  $R_1$, $R_2$, $R_3$ and $R_4$ represent $C_1$–$C_4$-alkyl;
  $R_5$, $R_6$, $R_7$ and $R_8$ represent hydrogen; and
  one of $R_9$ and $R_{10}$ independently of the other represents hydrogen or substituents or $R_9$ and $R_{10}$ both represent substituents, which comprises polymerizing by atom transfer radical polymerization (ATRP) an aliphatic monomer or oligomer containing ethylene groups in the presence of a polymerization initiator (II) having a radically transferable atom or group capable of initiating polymerization of monomers or oligopolymers containing ethylene groups and replacing the leaving group —X in a polymerisate (III) with a N→O compound of the formula $$\begin{array}{c} R_2 \; R_5 \\ R_1 \diagdown \diagup R_6 \\ \diagdown R_9 \\ \cdot\text{O} \leftarrow N \diagup R_{10}, \\ R_3 \diagup \diagdown R_8 \\ R_4 \; R_7 \end{array} \qquad (IVA)$$

wherein $R_1$–$R_{10}$ are as defined above, in the presence of a catalytically effective amount of an oxidizable transition metal complex catalyst.

7. A process according to claim 6 for the preparation of a polymer of the formula:

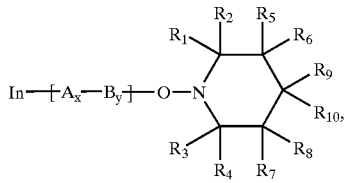

(IB)

wherein In, A, B, x, y, and $R_1$–$R_{10}$ are as defined in claim 6.

8. A process according to claim 6 for the preparation of a polymer, wherein the cyclic N→O fragment in formula IA represents a structural embodiment of the partial formula

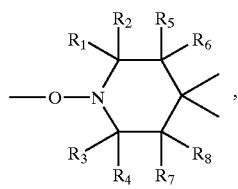

(B₀)

wherein $R_1$–$R_8$ are as defined in claim 6 and the 4-position is substituted by one or two substituents.

9. A process according to claim 8 for the preparation of a polymer, wherein the partial formula $B_0$ represents structural embodiments selected from the group consisting of the partial formulae

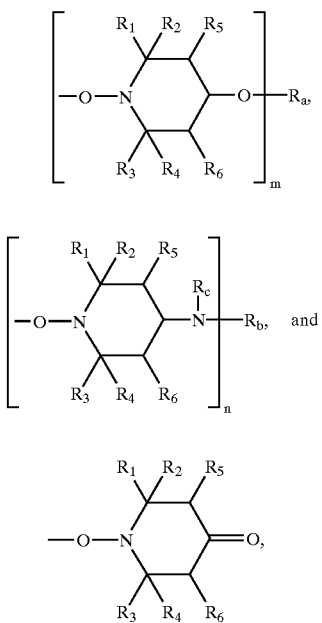

wherein
$R_1$–$R_6$ are as defined in claim 1;
m represents a numeral from one to four;
n represents one, two or three;
if m represents one,
  $R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 18 carbon atoms, of a cycloaliphatic carboxylic acid having 7 to 15 carbon atoms, of an a,b-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COOZ groups, in which Z represents H, $C_1$–$C_{20}$-alkyl, $C_3$–$C_{12}$-alkenyl, $C_5$–$C_7$-cycloalkyl, phenyl or benzyl; or $R_a$ represents a monovalent radical of a carbamic acid or phosphorus-containing acid or a monovalent silyl radical; or
if m represents 2,
  $R_a$ represents $C_2$–$C_{12}$-alkylene, $C_4$–$C_{12}$-alkenylene, xylylene, or represents a divalent radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms, where each dicarboxylic acid may be substituted in the aliphatic, cycloaliphatic or aromatic moiety by one or two —COOZ groups; or $R_a$ is a divalent radical of a phosphorus-containing acid or a divalent silyl radical; or
if m represents 3,
  $R_a$ represents a trivalent radical of an aliphatic, cycloaliphatic or aromatic tricarboxylic acid, which may be substituted in the aliphatic, cycloaliphatic or aromatic moiety by —COOZ, of an aromatic tricarbamic acid or of a phosphorus-containing acid, or is a trivalent silyl radical; or
if m represents 4,
  $R_a$ represents a tetravalent radical of an aliphatic, cycloaliphatic or aromatic tetracarboxylic acid;
if n represents one,
  $R_b$ represents $C_1$–$C_{12}$-alkyl, $C_5$–$C_7$-cycloalkyl, $C_7$–$C_8$-aralkyl, $C_2$–$C_{18}$-alkanoyl, $C_3$–$C_5$-alkenoyl or benzoyl;
  $R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl or represents a group of the formulae —CH$_2$CH(OH)—Z, —CO—Z— or —CONH—Z wherein Z represents hydrogen, methyl or phenyl, or $R_b$ and $R_c$ together represent the cyclic acyl radical of an aliphatic or aromatic 1,2- or 1,3-dicarboxylic acid;
if n represents two,
  $R_b$ is as defined above; and
  $R_c$ represents $C_2$–$C_{12}$-alkylene, $C_6$–$C_{12}$-arylene, xylylene, a —CH$_2$CH(OH)CH$_2$—O—B—O—OH$_2$CH(OH)CH$_2$— group, wherein B represents $C_2$–$C_{10}$-alkylene, $C_6$–$C_{15}$-arylene or $C_6$–$C_{12}$-cycloalkylene; or, provided that $R_b$ is not alkanoyl, alkenoyl or benzoyl, $R_c$ represents a divalent acyl radical of an aliphatic, cycloaliphatic or aromatic dicarboxylic acid or dicarbamic acid, or represents the group —CO—; or $R_c$ represents a group of the partial formula

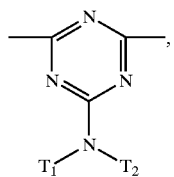

(C₀)

wherein $T_1$ and $T_2$ independently of the other represent hydrogen, $C_1$–$C_{18}$-alkyl, or $T_1$ and $T_2$ together represent $C_4$–$C_6$-alkylene or 3-oxapentamethylene; or if n represents 3, $R_c$ represents 2,4,6-triazinyl.

10. A process according to claim 9 for the preparation of a polymer, wherein the cyclic N→O fragment in formula $B_0$ represents structural embodiments selected from the group consisting of the partial formulae $B_1$ and $B_2$, wherein m represents 1;

$R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 12 carbon atoms, of a cycloaliphatic carboxylic acid having 7 to 15 carbon atoms, of an a,b-unsaturated carboxylic acid having 3 to 5 carbon atoms or of an aromatic carboxylic acid having 7 to 15 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_5$–$C_7$-cycloalkyl, $C_7$–$C_8$-aralkyl, $C_2$–$C_{18}$-alkanoyl, $C_3$–$C_5$-alkenoyl or benzoyl; and $R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl, or represents a group of the formula —$CH_2CH(OH)$—Z, —CO—Z or —CONH—Z, wherein Z is hydrogen, methyl or phenyl.

11. A process according to claim 9 for the preparation of a polymer, wherein the cyclic N→O fragment in formula $B_0$ represents structural embodiments selected from the group consisting of the partial formulae $B_1$ and $B_2$, wherein m represents 1;

$R_a$ represents hydrogen, $C_1$–$C_{18}$-alkyl, 2-cyanoethyl, benzoyl, glycidyl, or a monovalent radical of an aliphatic carboxylic acid having 2 to 12 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_7$–$C_8$-aralkyl, $C_2$–$C_{18}$-alkanoyl, $C_3$–$C_5$-alkenoyl or benzoyl; and $R_c$ represents $C_1$–$C_{18}$-alkyl, glycidyl, a group of the formulae —$CH_2CH(OH)$—Z or —CO—Z, wherein Z is hydrogen, methyl or phenyl.

12. A process for the preparation of polymer according to claim 6, wherein

In represents a polymerization initiator fragment of a polymerization initiator capable of initiating polymerization of monomers or oligopolymers containing ethylene groups and which polymerization initiator is selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-haloacrylates and halolactones;

p represents one;

q represents a numeral from one to three;

A and B represent oligopolymer or polymer fragments containing repeating units of polymerizable monomers selected from the group consisting of styrene, acrolein, acrylonitrile, acrylic or $C_1$–$C_4$-alkylacrylic acid-$C_1$–$C_4$-alkyl esters, acrylic or $C_1$–$C_4$-alkylacrylic hydroxy-$C_2$–$C_4$-alkyl esters, acrylic acid or $C_1$–$C_4$-alkylacrylic di-$C_1$–$C_4$-alkylamino-$C_2$–$C_4$-alkyl esters, acrylic or $C_1$–$C_4$-alkylacrylamides and acrylic or $C_1$–$C_4$-alkylacrylic acid anhydrides;

x and y represent numerals greater than one;

$R_1$, $R_2$, $R_3$ and $R_4$ represent methyl;

$R_5$, $R_6$, $R_7$ and $R_8$ represent hydrogen;

the cyclic N→O fragment in formula IA represents structural embodiments selected from the group consisting of the partial formulae $B_1$ and $B_2$, wherein m represents 1;

$R_a$ represents hydrogen, $C_1$–$C_{18}$-alkyl which is uninterrupted or interrupted by one or more oxygen atoms, 2-cyanoethyl, benzoyl, glycidyl, or represents a monovalent radical of an aliphatic carboxylic acid having 2 to 18 carbon atoms, of a cycloaliphatic carboxylic acid having 7 to 15 carbon atoms, or an a,b-unsaturated carboxylic acid having 3 to 5 carbon atoms or of an aromatic carboxylic acid having 7 to 15 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_5$–$C_7$-cycloalkyl, $C_7$–$C_8$-aralkyl, $C_2$–$C_{18}$alkanoyl, C3–$C_5$-alkenoyl or benzoyl; and $R_c$ represents $C_1$–$C_{18}$-alkyl, $C_5$–$C_7$-cycloalkyl, $C_2$–$C_8$-alkenyl unsubstituted or substituted by a cyano, carbonyl or carbamide group, glycidyl, or represents a group of the formulae —$CH_2CH(OH)$—Z, —CO—Z or —CONH—Z wherein Z is hydrogen, methyl or phenyl.

13. A process for the preparation of a polymer according to claim 6, wherein

In represents the polymerization initiator fragment of a polymerization initiator capable of initiating polymerization of monomers or oligopolymers containing ethylene groups and which polymerization initiator is selected from the group consisting of $C_1$–$C_8$-alkyl halides, $C_6$–$C_{15}$-aralkylhalides, $C_2$–$C_8$-haloalkyl esters, arene sulfonyl chlorides, haloalkanenitriles, α-haloacrylates and halolactones;

p and q represent one;

A and B represent oligopolymer or polymer fragments containing repeating units of polymerizable monomers selected from the group consisting of styrene, acrylic or $C_1$–$C_4$-alkylacrylic acid-$C_1$–$C_4$-alkyl esters, acrylic or $C_1$–$C_4$-alkylacrylic acid hydroxy-$C_2$–$C_4$-alkyl esters, acrylic or $C_1$–$C_4$-alkylacrylic acid di-$C_1$–$C_4$-alkylamino-$C_2$–$C_4$-alkyl esters, and acrylic or $C_1$–$C_4$-alkylacrylamides;

x and y represent numerals greater than one;

$R_1$, $R_2$, $R_3$ and $R_4$ represent methyl;

$R_5$, $R_6$, $R_7$ and $R_8$ represent hydrogen;

the cyclic N→O fragment in formula IA represents structural embodiments selected from the group consisting of the partial formulae $B_1$ and $B_2$, wherein m represents 1;

$R_a$ represents hydrogen, $C_1$–$C_{18}$-alkyl, 2-cyanoethyl, benzoyl, glycidyl, a monovalent radical of an aliphatic, carboxylic acid having 2 to 12 carbon atoms;

m represents 2;

$R_a$ represents a divalent radical of an aliphatic dicarboxylic acid having 2 to 36 carbon atoms;

n represents 1;

$R_b$ represents $C_1$–$C_{12}$-alkyl, $C_7$–$C_8$-aralkyl, $C_2$–$C_{18}$-alkanoyl, $C_3$–$C_5$-alkenoyl or benzoyl; and $R_c$ represents $C_1$–$C_{18}$alkyl, glycidyl, or a group of the formula —$CH_2CH(OH)$—Z or —CO—Z, wherein Z is hydrogen, methyl or phenyl.

14. A process according to claim 1, wherein the oxidizable transition metal in the transition metal complex salt is present as a transition metal complex ion in the lower oxidation state of a redox system.

15. A process according to claim 14, wherein the transition metal complex ion is a Cu(I) complex ion in the Cu(I)/Cu(II) system.

16. A polymer composition which comprises a) a polymer, copolymer, or oligomer obtainable by the process according to claim 1; and b) a polymer or oligomer of the formula $$A_x\text{—}B_y \qquad (V)$$

wherein

A represents an oligopolymer or polymer fragment consisting of repeating units of polymerizable monomers or oligopolymers containing ethylene groups;

x represents a numeral greater than one and defines the number of repeating units in A;

B represents a monomer, oligopolymer or polymer fragment copolymerized with A; and y represents zero or a numeral greater than zero and defines the number of monomer, oligopolymer or polymer repeating units in B.

* * * * *